US007457682B1

(12) United States Patent
Varnell

(10) Patent No.: US 7,457,682 B1
(45) Date of Patent: Nov. 25, 2008

(54) EMBROIDERED ARTICLE WITH DIGITIZED AUTOGRAPH AND PALM PRINT

(76) Inventor: Vickie Varnell, 3005 Green Pasture Rd., Rocky Mount, NC (US) 27801

(*) Notice: Subject to any disclaimer, the term of this patent is extended or adjusted under 35 U.S.C. 154(b) by 0 days.

(21) Appl. No.: 11/686,160

(22) Filed: Mar. 14, 2007

(51) Int. Cl.
*G06F 19/00* (2006.01)

(52) U.S. Cl. .................. 700/130; 700/138; 112/475.08; 112/475.18

(58) Field of Classification Search ................. 700/130, 700/131, 132, 136, 138; 112/402, 439, 470.01, 112/470.04, 475.08, 475.18, 475.19, 475.01
See application file for complete search history.

(56) References Cited

U.S. PATENT DOCUMENTS

| | | | | |
|---|---|---|---|---|
| 4,875,953 | A * | 10/1989 | Lloyd | 156/62 |
| 4,998,489 | A * | 3/1991 | Hisatake et al. | 112/103 |
| 5,005,500 | A * | 4/1991 | Kato et al. | 112/102.5 |
| 5,319,565 | A * | 6/1994 | Hausammann et al. | 700/131 |
| 5,510,994 | A * | 4/1996 | Tsonis et al. | 700/137 |
| 5,740,056 | A * | 4/1998 | Futamura | 700/138 |
| 6,324,441 | B1 * | 11/2001 | Yamada | 700/138 |
| 6,629,015 | B2 * | 9/2003 | Yamada | 700/138 |
| 6,804,573 | B2 * | 10/2004 | Goldman | 700/138 |
| 6,947,808 | B2 * | 9/2005 | Goldman | 700/138 |
| 7,016,756 | B2 * | 3/2006 | Goldman | 700/138 |
| 2002/0007228 | A1 * | 1/2002 | Goldman | 700/138 |
| 2002/0038162 | A1 * | 3/2002 | Yamada | 700/138 |
| 2002/0108189 | A1 * | 8/2002 | Kahl | 8/445 |
| 2004/0243272 | A1 * | 12/2004 | Goldman | 700/138 |
| 2004/0243273 | A1 * | 12/2004 | Goldman | 700/138 |
| 2005/0182508 | A1 * | 8/2005 | Niimi et al. | 700/138 |
| 2006/0054706 | A1 * | 3/2006 | Waldo et al. | 235/487 |

OTHER PUBLICATIONS

JOANNdesigns.com, Hands, www.joanndesigns.com, Apr. 25, 2006.*

Family Memories and More, Handprint & Footprint Shirts, www.familymemoriesandmore.com, Dec. 2, 2006.*

Michelle's Designs, The Legacy Personalized Tote, Mar. 5, 2005, http://www.michelles-designs.com/legacy-totebag.html.*

* cited by examiner

*Primary Examiner*—Gary L. Welch
*Assistant Examiner*—Nathan E Durham
(74) *Attorney, Agent, or Firm*—Ishman Law Firm P.C.

(57) ABSTRACT

A personalized article associated with a child includes a panel bearing an embroidered image based on a hand or foot print and autographed name impression of the child that is digitized and enhanced for use in creating a replicated stitched image on the panel using a digitally controlled embroidery machine.

2 Claims, 7 Drawing Sheets

EMBROIDERED ARTICLE WITH DIGITIZED AUTOGRAPH AND PALM PRINT

FIELD OF THE INVENTION

The present invention relates to personalized articles and, in particular, to a cloth display article having an embroidered digitized replica of an autograph and palm print of a child.

BACKGROUND OF THE INVENTION

Children's mementos are cherished and collected by parents, grandparents and other friends are relatives as gifts or display articles. From birth when footprints are oftentimes taken, to schools activities where artwork is created, to parties where personalized gifts are fashioned, the child's growth and skills as presented in these renderings are proudly collected.

Early childhood articles such as natal footprints are generally stored in albums as official documents and not the subject of display. The school artwork may be displayed at the home, but rarely shown elsewhere. Handprints formed in clay have remained popular over the years, but also displayed primarily in the home and not suited for display to others. Ceramic plates and the like having a replica of a child's drawing, name and age are also common, but because of size and shape generally collected and displayed at home.

Photographs, on the other hand, lend themselves to distribution and display on a broader basis. And the viewers note not only the progress of the child but also the pride of the parent in sharing with others.

Accordingly, it would be desirable to provide additionally formats that could be carried with the parents or relatives that would show to friends and observers, the cherished relationship and personalized attributes of the child.

SUMMARY OF THE INVENTION

This present invention provides a panel of embroidered stitching bearing the autograph and hand or foot print of a child incorporated into an article for travel and/or display, such as a tote bag. For the panel, the child creates a signature specimen that is scanned and digitized. As necessary for clarity on the panel, the digitized signature is revised to eliminate errata and embolden indistinct portions. Similarly, the child creates a print impression on a print specimen that is scanned and digitized. The digitized print impression is then artistically enhanced to remove ridge lines and heighten indistinct areas while retaining the major characteristics of the child's print. The revised digitized images are then combined, resized and tailored into a software file for interfacing with a software controlled embroidery machine. The digitized image is then transferred as embroidered stitching to a panel for the desired article, before or after assembly. Multiple child panels may also be created. As a tote bag, the child's signature and print are displayed for all to see.

Accordingly, it is an object of the invention to provide an article having an embroidered image replicating a print impression by a child.

Another object is to provide a method a making a personalized article bearing an embroidered replicated image of a hand or foot print of a child.

A further object is to provide a portable article bearing an embroidered panel having a stitched replication of a hand print of a child and the child's personally written name.

BRIEF DESCRIPTION OF THE DRAWINGS

The above and other advantages of the present invention will become apparent upon reading the following written description taken in conjunction with the accompanying drawings in which.

DETAILED DESCRIPTION OF THE PREFERRED EMBODIMENT

Figure 1:
FIG. 1 is a front view of a tote bag having a digitized and autographed embroidered pattern of the name and palm print of an associated individual.

Referring to FIG. 1, there is illustrated a tote bag 10 provided with a front panel 12 having embroidered thereon an enhanced digitized autograph indicia 14 and a print indicia 16 replicated from the actual signature and palm print provided by an individual such as a child. An accompanying phrase indicia 18 is also included. While the invention is hereinafter described with reference to a tote bag and palm print, it will be appreciated that the panel may be displayed on other articles and with other print bases such as foot or sole prints, with or without the autograph indicia or phrase indicia. As illustrated, three sets of names and associated prints are displayed. The tote bag 10 is provided conventionally with a rear panel to form an upwardly opening pocket closed by a zipper and handles for carrying.

Figure 2:
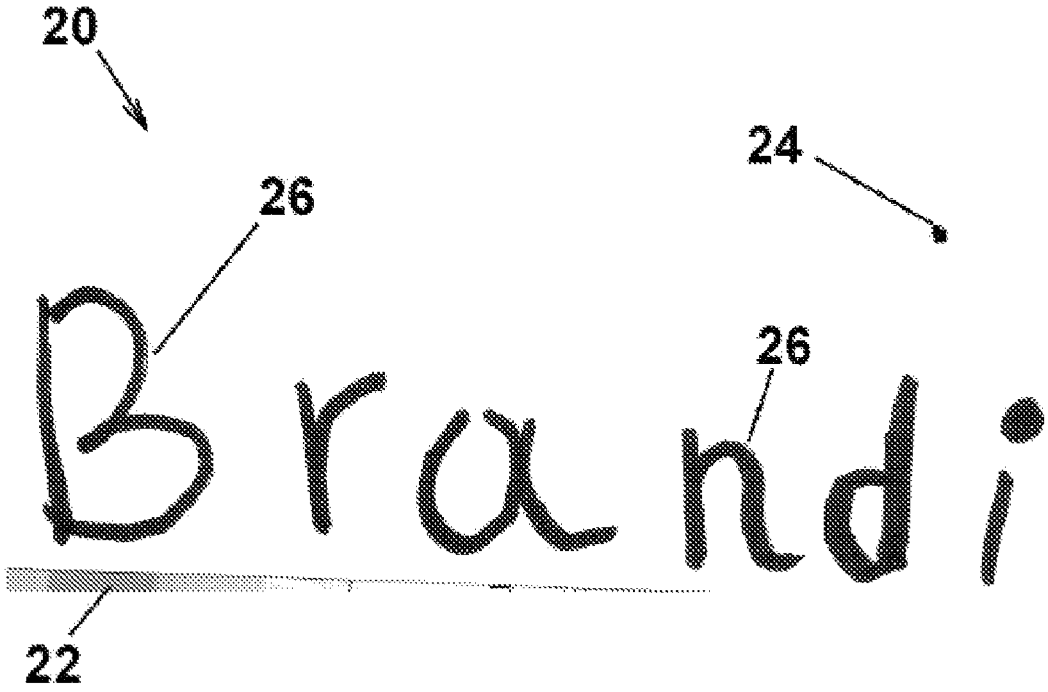
FIG. 2 is a view of a signature impression prior to artistic revision.
Figure 4:
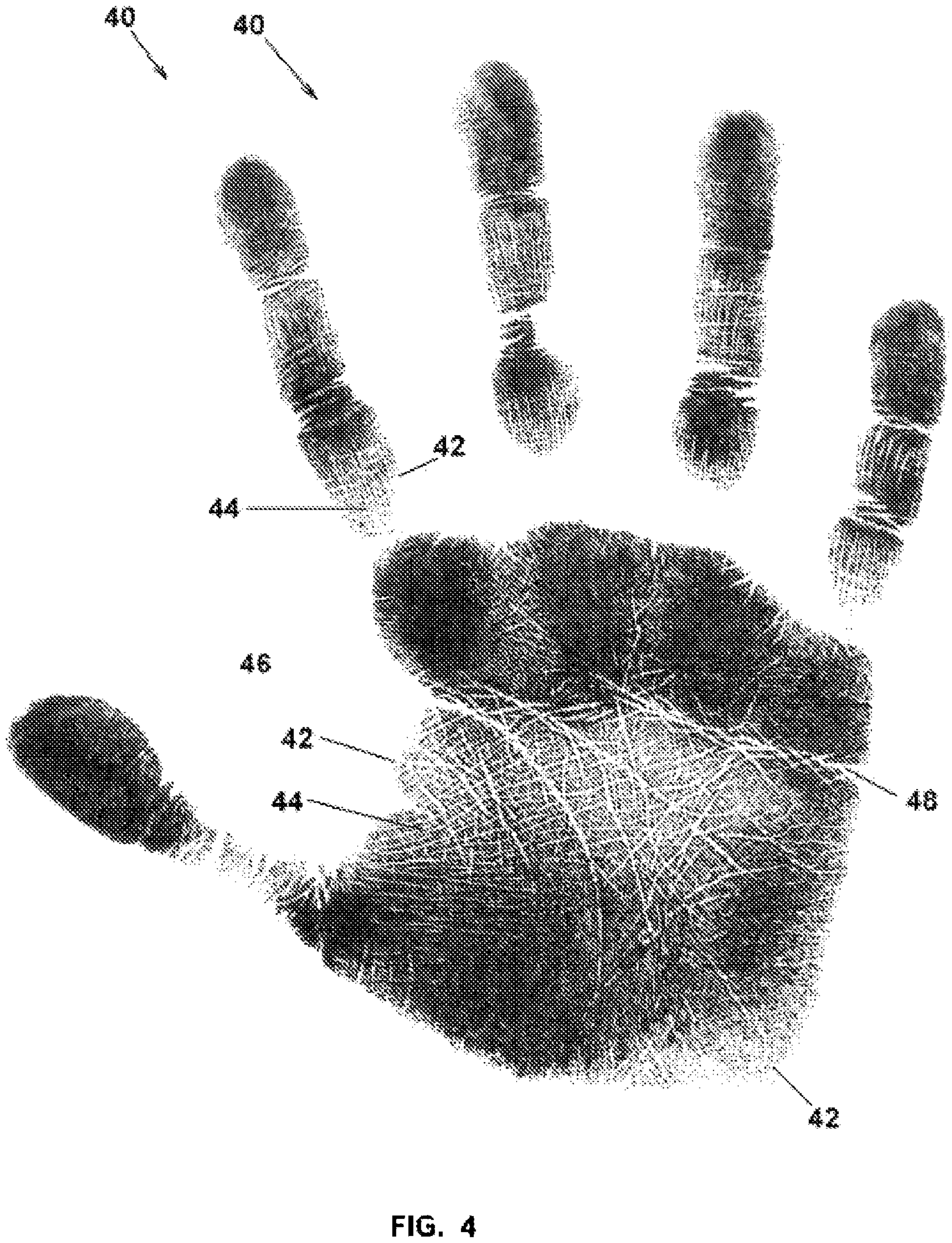
FIG. 4 is a view of a handprint impression prior to artistic revision.

The autograph indicia 14 and the print indicia 16 are obtained from actual print impressions and signatures of the child. The autograph indicia 14 is secured from an actual printed signature by the child, for instance by signature on signature sheet. The sheet is then digitally scanned and a digital signature 20 created as shown in FIG. 2. Similarly, the print indicia 16 is secured by an ink impression of the palm or sole of the child on an impression sheet. The impression sheet is then also scanned and a digital print 40 created as shown in FIG. 4. The phrase indicia 18 may be secured on the same or separate sheets, or created digitally.

Figure 3:
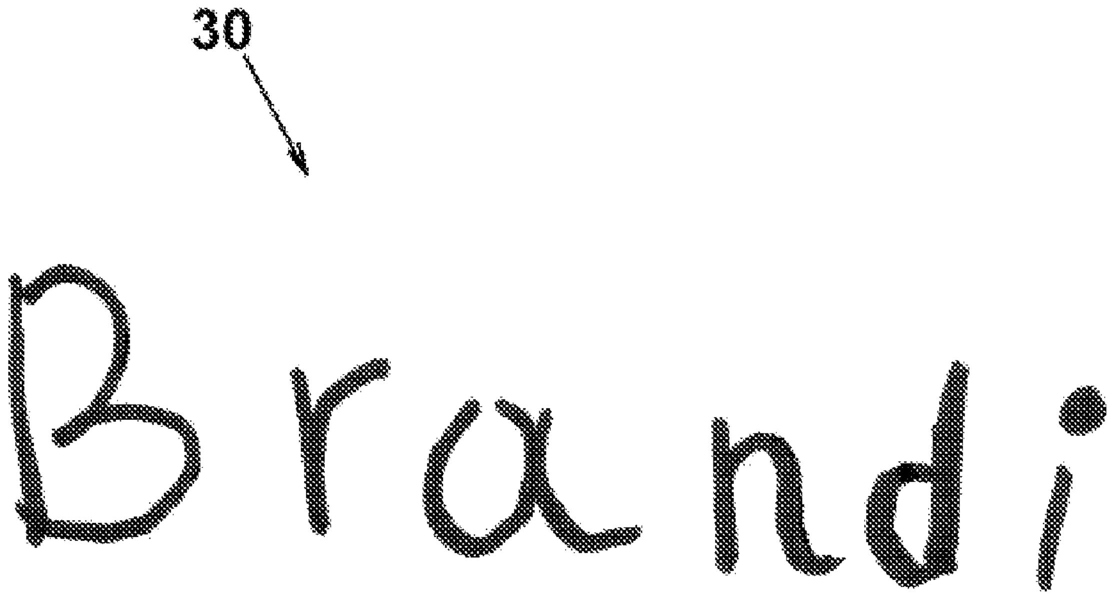
FIG. 3 is a view of the signature impression of FIG. 2 after artistic revision.

Oftentimes, the signature and print impression contain areas that are extraneous, ambiguous or delineate features too detailed to be embodied by embroidery stitching on the panel. To handle such situations, an artistic interpretation and revision of the original digital image is undertaken. As shown in FIG. 3, the digital signature 20 for the child includes a line 22 for assistance in printing, extraneous coloration 24, faint letter portions 26, minor printing errors and other errata that can detract from the final article. While retaining the essence of the signature, such errata is removed for clarity and the resulting enhanced digital signature 30 is shown in FIG. 4. It will be noted that the line has been removed, the faint letter portions filled in, the background cleaned.

Similarly, the digital print 40, as shown in FIG. 4, contains areas for the digits and palm wherein the peripheral contours 42 are hazy or incomplete in the impression, and other areas 44 where ridge lines provide unnecessary detailing. The major palm lines 46 and joints 48 and other characteristics are clear but somewhat obscured by surrounding faint areas. The digital print is then artistically enhanced to produce the enhanced digital print 50 shown in FIG. 5 wherein the digital peripheries 52 and palm peripheries 54 are more clearly delineated, the ridge areas 56 filled in, while retaining the major palm lines 58 and digit fold lines 60 and other major marking characteristics. The phrase indicia may be similarly processed if necessary.

Figure 6:
FIG. 6 is a view of the printed signature for the handprint of FIG. 2.

Thereafter, enhanced digital autograph 30, print 50 and phrase indicia 18 are combined in a file as a single image, and arranged and sized as desired for presentation on the selected pane. The file is then transferred to the software associated with a software controlled embroidery machine for selection of the stitching colors and stitching specifications for replicating the panel features. The machine embroiders the combined enhanced image, with thread, coloration, and settings appropriate for the overall artistic impression on the panel substrate. The machine then creates on the panel substrate the embroidered enhanced image as shown in FIG. 1 incorporating the signature and print described above as shown in FIG. 6. The panel 12 is then integrated into the tote bag. Alternatively, the panel may be created on a panel of an existing article.

The tote bag as illustrated in FIG. 1 was created in accordance with the following example.

EXAMPLE

A child, Brandi, printed her name on a paper sheet with a black felt tip pen. The sheet was then scanned using the Digitizer 1000 program from Janome. The resulting digital image of her autograph is shown in FIG. 2 and was saved in a file. Next the child had her palm inked and pressed her hand against a paper sheet to form an impression. The sheet was then scanned with the above program producing the resulting digital image shown in FIG. 4 and saved in another file. The phrase indicia shown in FIG. 1 was created directly on the program and saved as a file.

Figure 5:
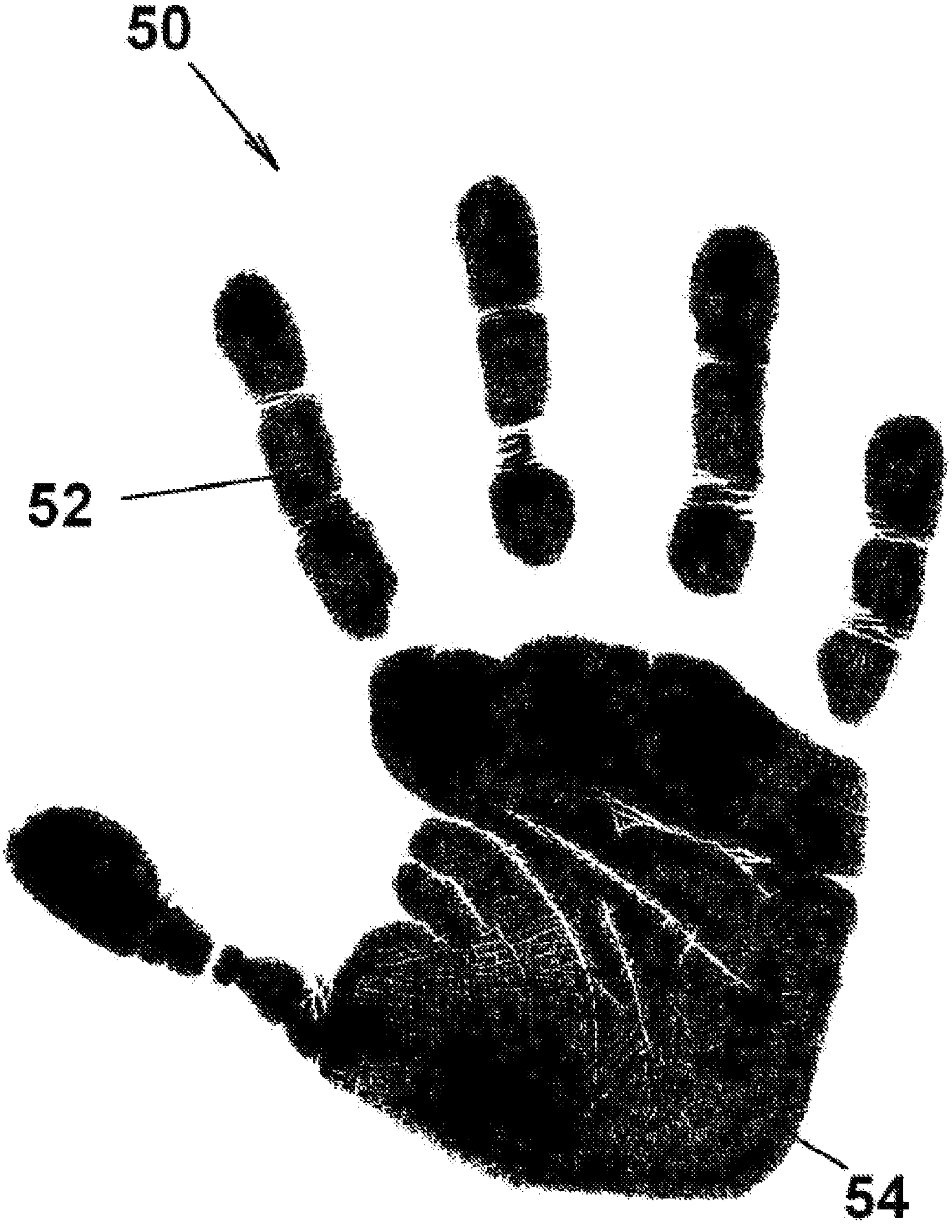
FIG. 5 is a view of the handprint of FIG. 3 after artistic revision.

In the program file, the artistic creator used the MICROSOFT PAINT program to remove the errata and clarified the autograph image to produce the enhanced autograph indicia shown in FIG. 3. Thereafter, the print image was similarly enhanced as shown in FIG. 5. Therein it will be noted that fingers, palm and thumb area were clarified to provide clear peripheries and the ridges eliminated to provide continuous coloration while presenting the major fold lines and palm characteristics.

The individuals phrase, autograph and print files were merged into a single file, sized and reoriented into the desired presentation for the panel. Colors for the embroidery thread were chosen and a thread selected. In the Digitizer program, the appropriate machine controls for a cloth substrate and colors for indicia were selected in the program. The resultant production file was interfaced with the control system of a Brother BE-0901-ac embroidery machine and the images stitched onto an existing panel of a previously assembled tote bag to produce the article shown in FIG. 1 based on the images of FIGS. 3 and 5.

Figure 7:
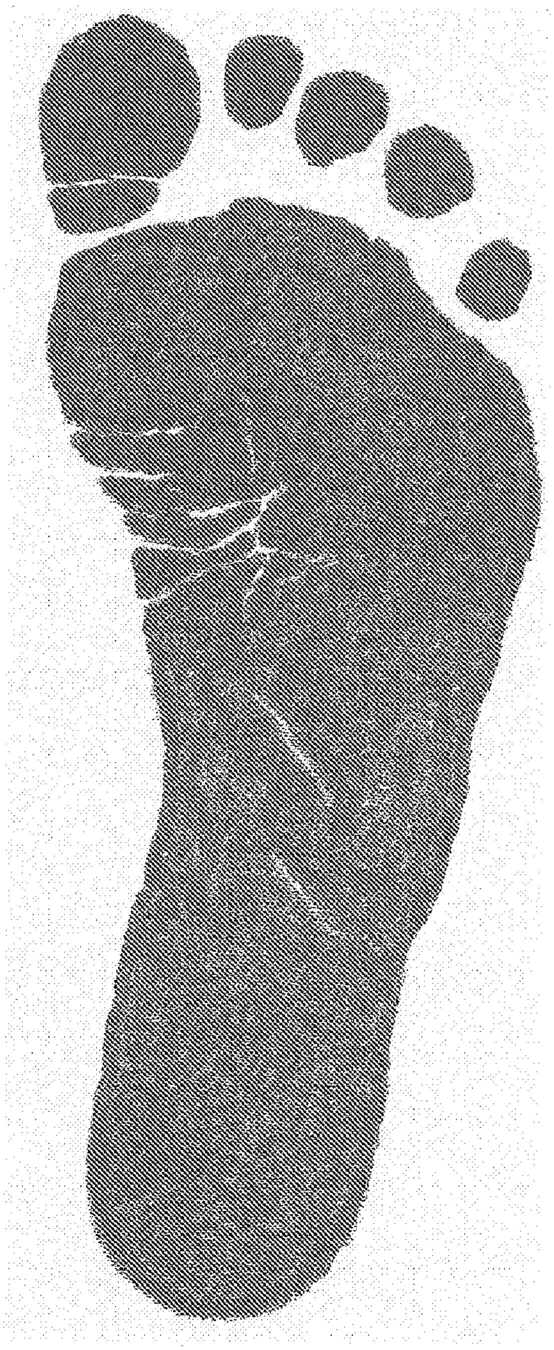
FIG. 7 is a view of a footprint after artistic revision.

For foot prints as shown in FIG. 7 or other body prints, the foregoing method may be employed. Other personalized indicia may be added such as age, date of birth, nicknames, event, or like identification for relating the image to the child. While a cloth substrate is preferable for the embroidery, other materials within the capability of a selected machine may be used. Further, the finished panel may be incorporated on or in conjunction with other substrates and articles.

Having thus described a presently preferred embodiment of the present invention, it will now be appreciated that the objects of the invention have been fully achieved, and it will be understood by those skilled in the art that many changes in construction and widely differing embodiments and applications of the invention will suggest themselves without departing from the spirit and scope of the present invention. The disclosures and description herein are intended to be illustrative and are not in any sense limiting of the invention, which is defined solely in accordance with the following claims.

What is claimed:

1. A method of making an embroidered article having an association with an individual, comprising the steps of:

coating a body part selected from the hand or foot of the individual with a transfer coating;

pressing the transfer coating against a first substrate to obtain a transferred impression of the body part on a first substrate;

obtaining of a signature by the individual on a second substrate;

scanning said substrates to obtain digital images of said transferred impression of the hand and said signature;

digitally revising said digital image of said signature to remove errata and an increased clarity therefor thereby providing a revised signature digital image;

digitally revising said digital image of said transferred impression of said hand to provide a continuous periphery and filling the interior of the impression while retaining major palm line and fold lines thereby providing a revised hand impression digital image;

combining said revised signature digital image and said revised had impression digital image to provide a combined digital image;

interfacing said combined digital image with a digitally controlled embroidery machine having means for effecting embroidered stitching replicating said combined digital image on a first panel; and operating said machine to create said embroidered stitching on said first panel.

2. The method as recited in claim 1 including attaching said first panel to a second panel at the sides and bottoms of said panel to form an upwardly opening pocket; and attaching handles at said sides to form a tote bag.

* * * * *